United States Patent [19]
Saigusa

[11] Patent Number: 5,961,223
[45] Date of Patent: Oct. 5, 1999

[54] BEARING SEALING PLATE AND METHOD OF MANUFACTURING THEREOF

[75] Inventor: Shigeharu Saigusa, Tenri, Japan

[73] Assignee: Toyo Seal Industries, Co., Ltd., Nara-Ken, Japan

[21] Appl. No.: 08/736,280

[22] Filed: Oct. 24, 1996

Related U.S. Application Data

[62] Division of application No. 08/277,108, Jul. 20, 1994, abandoned.

[30] Foreign Application Priority Data

Jul. 28, 1993 [JP] Japan ................................. 5-207270

[51] Int. Cl.$^6$ ..................................................... F16C 33/78
[52] U.S. Cl. ................................................................. 384/484
[58] Field of Search ..................... 384/484, 485, 384/486, 482, 147, 148

[56] References Cited

U.S. PATENT DOCUMENTS

| | | |
|---|---|---|
| 1,972,789 | 9/1934 | Newkirk . |
| 2,325,290 | 7/1943 | Wales . |
| 2,355,765 | 8/1944 | Wales . |
| 3,268,984 | 8/1966 | Kupchick . |
| 3,332,308 | 7/1967 | Keen . |
| 4,078,287 | 3/1978 | Kupchick . |
| 4,243,235 | 1/1981 | Repella . |
| 4,398,984 | 8/1983 | Uchiyama et al. . |
| 5,055,155 | 10/1991 | Crotty et al. . |
| 5,077,888 | 1/1992 | Tokisue et al. . |
| 5,272,800 | 12/1993 | Rooney et al. . |
| 5,385,352 | 1/1995 | Kurose ................................. 384/484 |
| 5,401,106 | 3/1995 | Yamamoto ........................... 384/484 |
| 5,403,421 | 4/1995 | Hinterseer . |
| 5,412,972 | 5/1995 | Congelliere . |

FOREIGN PATENT DOCUMENTS

| | | |
|---|---|---|
| 474950 | 3/1992 | European Pat. Off. . |
| 8812628 | 11/1988 | Germany . |
| 5-296250 | 11/1993 | Japan . |
| 1101464 | 1/1968 | United Kingdom . |

*Primary Examiner*—Lenard A. Footland
*Attorney, Agent, or Firm*—Birch, Stewart, Kolasch & Birch, LLP

[57] ABSTRACT

A sealing plate for a bearing, includes a metallic ring-plate, and a vulcanized elastic material ring-plate having an outer peripheral edge portion protruding outwardly from the metallic ring-plate. The ring-plates are respectively punched from a metallic plate on which an elastic material is applied and an elastic material plate without using metal molds. The metallic ring-plate and the vulcanized elastic material ring-plate are overlapped and then bonded to each other, with centers thereof being aligned with each other. The outer peripheral edge portion of the elastic material ring-plate has such a width as to be bent for wrapping in the outer peripheral edge of the metallic ring-plate therein, when it is forced into a sealing groove of the bearing.

8 Claims, 12 Drawing Sheets

BEARING SEALING PLATE AND METHOD OF MANUFACTURING THEREOF

This is a division of Ser. No. 08/277,108 filed Jul. 20, 1994, abandoned.

BACKGROUND OF THE INVENTION

The present invention relates to sealing of a bearing, and more particularly, to a sealing plate for a bearing, and a method of manufacturing thereof.

In a conventional sealing plate 56 for a bearing shown in FIG. 26, a core metal formed by punching a metallic plate is placed in a recess or concave portion of a metal mold for molding. Then, elastic material is poured in the mold, subsequently heated and pressurized, simultaneously vulcanized, and thus the bearing sealing plate is formed. The forward edge diameter of the formed sealing plate 56 is larger than an opening diameter of a bearing sealing groove 51a, and a wall face of the sealing groove of an outer ring 51 or inner ring 52 of the bearing is sunken so as to force the bearing sealing plate 56 into the sealing groove 51a, thus causing the elastic forward edge portion of the sealing plate 56 to depress the wall face of the sealing groove 51a to achieve the sealing. In FIG. 26, reference numeral 50 denotes a ball of the bearing, 53 a retainer, 54 the core metal of the sealing plate 56, and 55 a ring-plate made of elastic material such as synthetic rubber and having a lip 55a sliding on a tapered face 52a of the inner ring 52.

In the conventional manufacturing method of the bearing sealing plate as described above, however, there have been such disadvantages that, not only the metal mold is necessary, but a lot of expense is required for the metal mold due to complicated construction and shapes between the bearing sealing plate and the sealing groove of the bearing. Also, a considerable amount of time is required for the vulcanization of rubber with the mold, and removal of burr from the bearing sealing plate is also required after the molding. This results in an increase of the number of manufacturing steps and time, with a consequential rise in cost.

SUMMARY OF THE INVENTION

Accordingly, an object of the present invention is to provide a manufacturing method for a bearing sealing plate and a bearing sealing plate made by this method. A, metal mold, vulcanization of rubber, and removal of burr is required, while particular consideration is not necessary for the construction and configuration of the bearing seal groove.

Another object of the present invention is to provide a manufacturing method for a bearing sealing plate and a bearing sealing plate made by this method which are simple and can be readily incorporated in a production line at low cost.

In accomplishing these and other objects, according to a first aspect of the present invention, there is provided a method of manufacturing a sealing plate for a bearing, which comprises the steps of:

forming an elastic material layer having adhesive property on a surface of one of a metallic plate and a vulcanized elastic material plate;

punching a metallic ring-plate from the metallic plate by a punching press, and punching from the elastic material plate an elastic material ring-plate having an outer peripheral edge portion outwardly protruded from an outer peripheral edge of the metallic ring-plate by a punching press;

overlapping the metallic ring-plate and the elastic material ring-plate, with the elastic material layer having the adhesive property being positioned between the metallic ring-plate and the elastic material ring-plate, and with centers thereof being aligned with each other; and bonding the metallic ring-plate and the elastic material ring-plate via the elastic material layer to each other through pressurization and/or pressurization and heating, thereby to form the sealing plate.

According to a second aspect of the present invention, a sealing plate can be provided for a bearing, which comprises:

a metallic ring-plate punched from a metallic plate by a punching press;

a vulcanized elastic material ring-plate punched from the elastic material plate by a punching press and having an outer peripheral edge portion outwardly protruded from an outer peripheral edge of the metallic ring-plate; and an elastic material layer formed on a surface of one of the metallic plate and the vulcanized elastic material plate and having adhesive property for bonding the metallic ring-plate and the vulcanized elastic material ring-plate by overlapping the metallic ring-plate and the elastic material ring-plate, with the elastic material layer having the adhesive property being positioned between the metallic ring-plate and the elastic material ring-plate and with centers of the metallic ring-plate and the vulcanized elastic material ring-plate being aligned with each other, and pressing and/or pressing and heating, thereby to form the sealing plate.

According to a third aspect of the present invention, a sealing plate for a bearing can be provided, which comprises:

a metallic ring-plate;

a vulcanized elastic material ring-plate having an outer peripheral edge portion outwardly protruded from an outer peripheral edge of the metallic ring-plate; and an elastic material layer having adhesive property for bonding the metallic ring-plate and the vulcanized elastic material ring-plate with centers of the metallic ring-plate and the vulcanized elastic material ring-plate being aligned with each other.

The elastic material layer having the adhesive property, formed on the surface of the metallic plate or vulcanized elastic material plate is formed by bonding the metallic ring-plate blanked or punched from the metallic plate with the elastic material ring-plate blanked or punched from the vulcanized elastic material plate through pressurization or heating and pressurization.

The metallic ring-plate serves as a core metal of the sealing plate, and the elastic material ring-plate seals the bearing at its outer peripheral portion.

The outer peripheral edge portion of the elastic material ring-plate extending outwardly from the outer peripheral edge of the metallic ring-plate readily gets to fit the configuration of the sealing groove for deformation, and wraps the outer peripheral edge of the metallic ring-plate therein so as to depress the upper shoulder portion and the bottom portion of the sealing groove for close contact therewith, thereby perfectly sealing the bearing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiments thereof with reference to the accompanying drawings which are given by way of illustration only, and thus are not limitative of the present invention, in which.

DETAILED DESCRIPTION OF THE EMBODIMENTS

Figure 1:
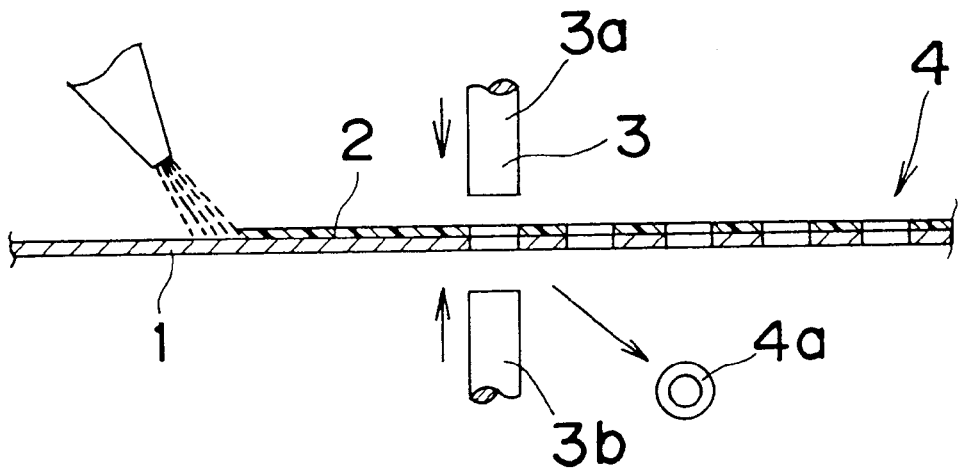
FIG. 1 is a schematic diagrams for explaining steps of applying an elastic material on a surface of a metallic plate and punching a metallic ring-plate punched from the metallic plate on which the elastic material is applied in a method for manufacturing a bearing sealing plate according to an embodiment of the present invention.

Before the description of the present invention proceeds, it is to be noted that like parts are designated by like reference numerals throughout the accompanying drawings.

Referring now to the drawings, FIGS. 1–7 show schematic diagrams for explaining steps for manufacturing a bearing sealing plate according to an embodiment of the present invention.

Figure 2:
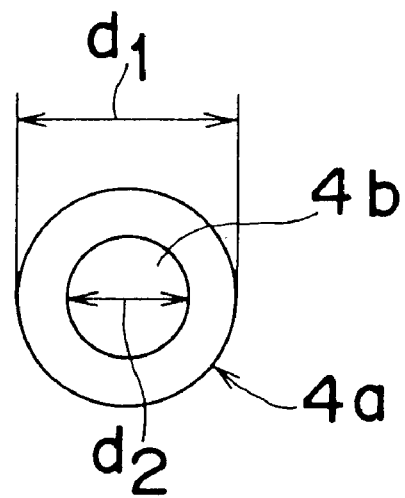
FIGS. 2 and 3 are a plan view and a cross-sectional side view of the punched metallic ring-plate in FIG. 1.
Figure 3:
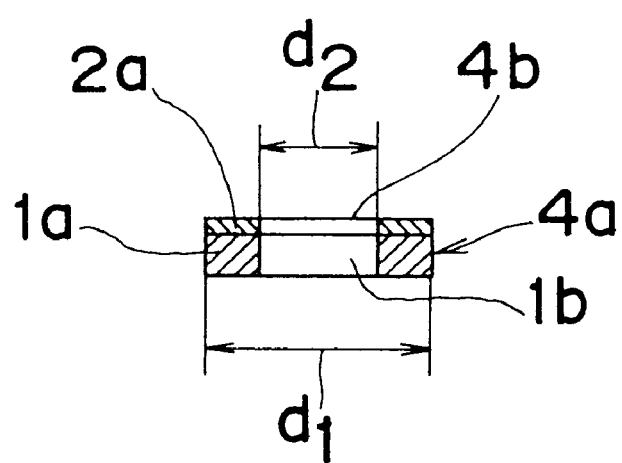

In FIG. 1, a metallic plate 1 wound in a roll form (not shown) is successively drawn out, and elastic material having adhesive property, e.g., thermo-plastic resin or adhesive material capable of bonding by pressurization is sprayed or painted on the surface of the metallic plate 1 so as to form an elastic material layer 2 with adhesive property thereon,. A material plate 4 composed of the metallic plate 1 and the elastic material layer 2 formed thereon is then blanked by upper and lower dies 3a and 3b of a blanking or punching press 3 to obtain a metallic ring-plate 4a as shown in FIGS. 1–3.

Figure 4:
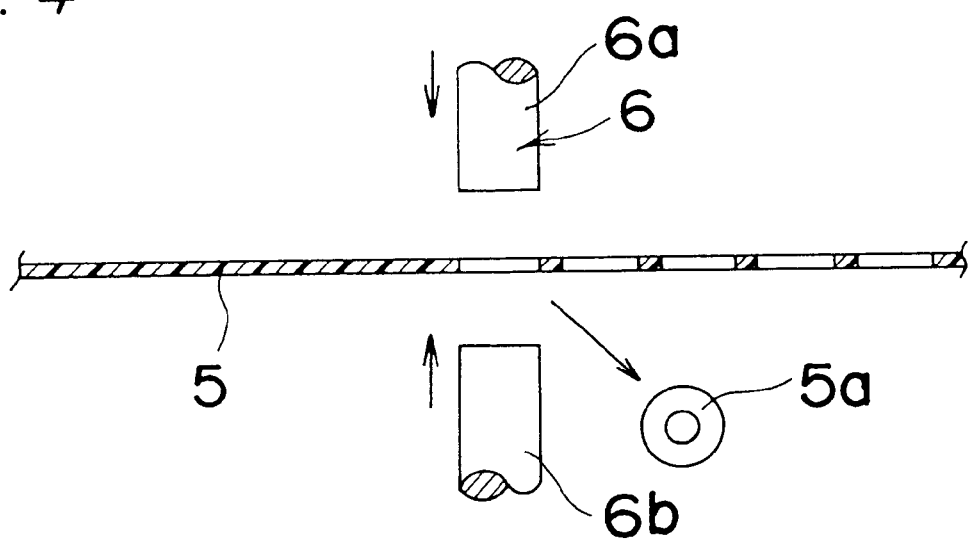
FIG. 4 is a schematic diagram for explaining a step of punching an elastic material ring-plate from an elastic material plate in the method for manufacturing a bearing sealing plate according to the embodiment of the present invention.
Figure 5:
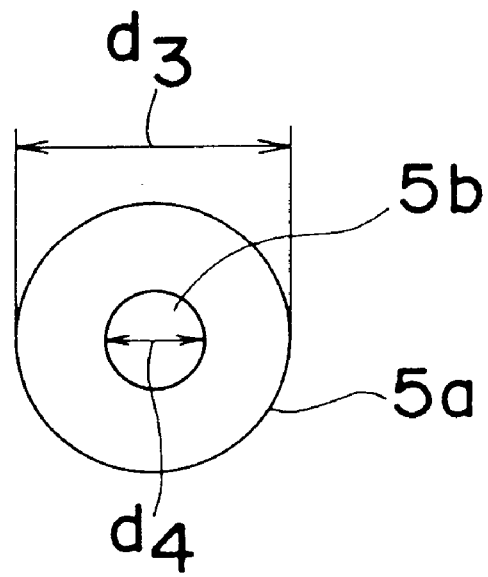
FIGS. 5 and 6 are a plan view and a cross-sectional side view of the punched elastic metallic ring-plate in FIG. 4.
Figure 6:
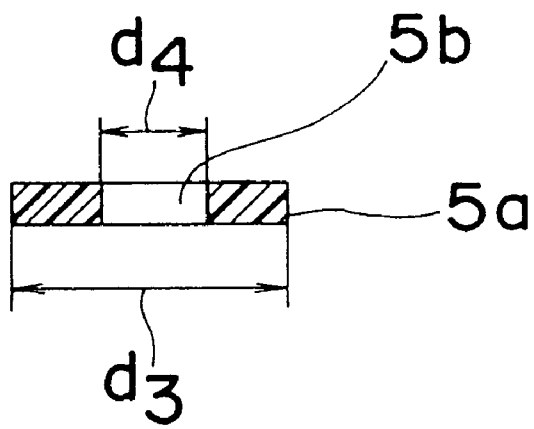

Meanwhile, as shown in FIG. 4, a vulcanized elastic material plate 5 made of natural or synthetic rubber such as NBR, acrylic rubber, or fluororubber or elastic synthetic resin wound in a roll form (not shown) is successively drawn out, and is blanked by upper and lower dies 6a and 6b of a blanking press 6 to obtain an elastic material ring-plate 5a as shown in FIGS. 4–6. The process may, for example, be so modified that the elastic material layer 2 having the adhesive property is formed on the surface of the elastic material plate 5 instead of being formed on the surface of the metallic plate 1.

Figure 18:
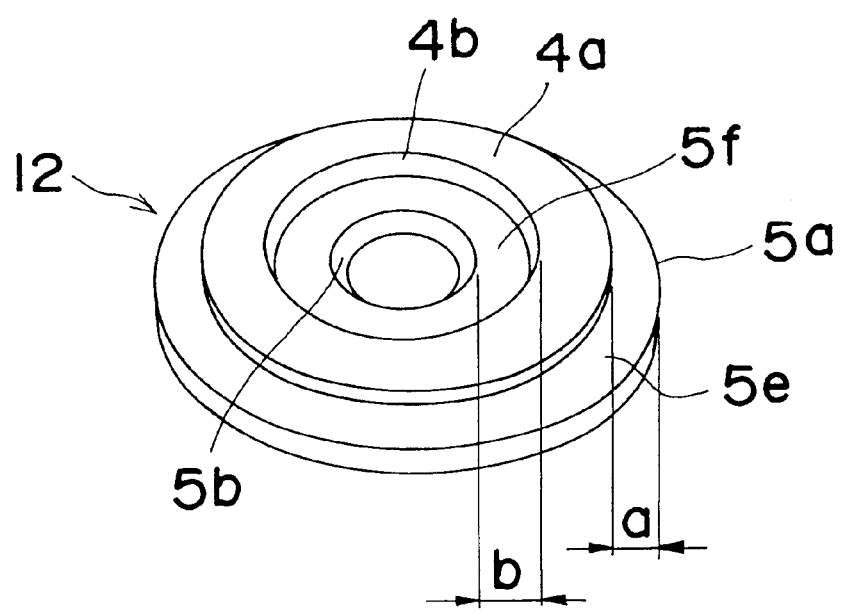
FIG. 18 is a perspective view of the sealing plate manufactured by the concrete method.

In the embodiment, the outer diameter d3 of the elastic material ring-plate 5a is set to be larger than an outer diameter d1 of the metallic ring-plate 4a. When the metallic ring-plate 4a is overlapped with the elastic material ring-plate 5a, with centers thereof aligned with each other, the outer peripheral edge portion 5e of the elastic material ring-plate 5a is adapted to protrude or extend outwardly from the peripheral edge of the metallic ring-plate 4a by a width a (=(d3-d1)/2) as shown in FIG. 18.

Figure 20:
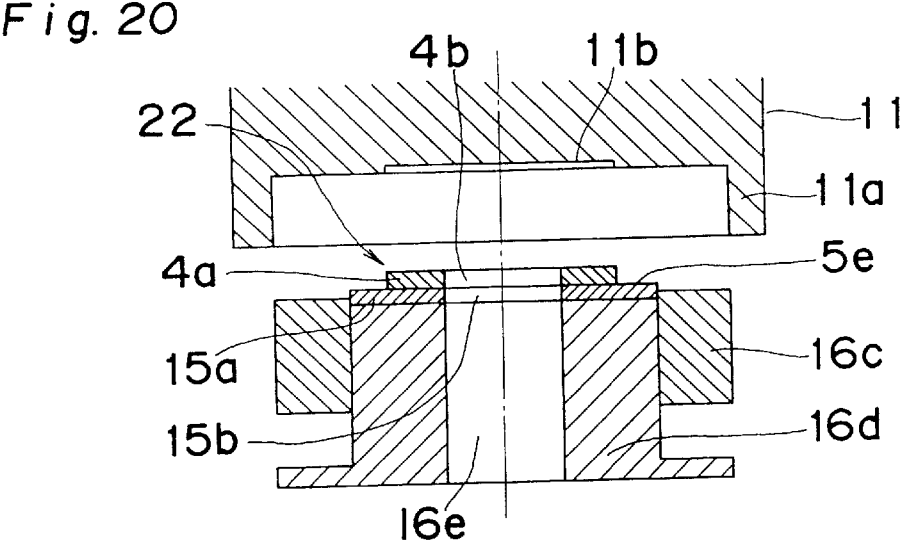
FIG. 20 is a schematic view for explaining a step of overlapping and bonding the metallic ring-plate and the elastic material ring-plate in another concrete method.
Figure 21:
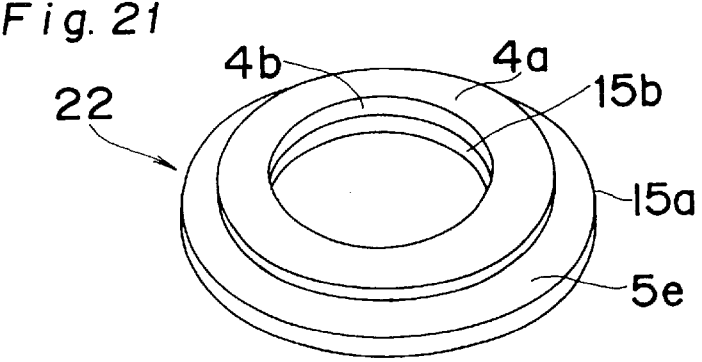
FIG. 21 is a perspective view of the sealing plate manufactured by the concrete method in FIG. 20.
Figure 22:
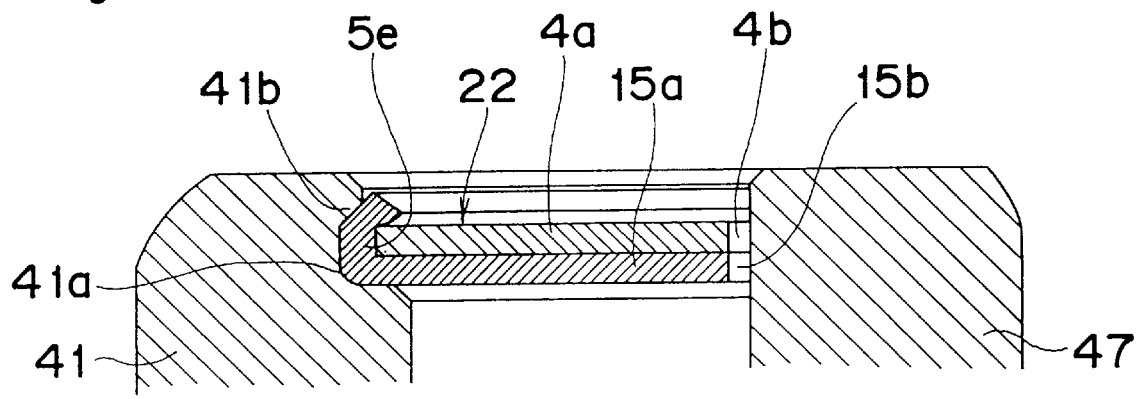
FIG. 22 is a partial and enlarged cross-sectional side view of the bearing on which the sealing plate in FIG. 21 is mounted.

The diameter d2 of an inner hole 4b of the metallic ring-plate 4a can be equal to the diameter d4 of an inner hole 5b of the elastic material ring-plate 5a as shown in FIGS. 20–22. On the other hand when the diameter d4 of the inner hole 5b for the elastic material ring-plate 5a is made smaller than the diameter d2 of the inner hole 4b for the metallic ring-plate 4a so that, upon overlapping the both plates 4a and 5a, with the centers thereof aligned with each other, the inner peripheral edge portion 5f of the elastic material ring-plate 5a protrudes from the peripheral edge of the metallic ring-plate 4a by a width b (=(d2–d4)/2) as shown in FIG. 18, and the inner peripheral edge portion 5f of the elastic material ring-plate 5a can contact the inner ring 42 of the bearing for perfect sealing as described more in detail later.

Figure 7:
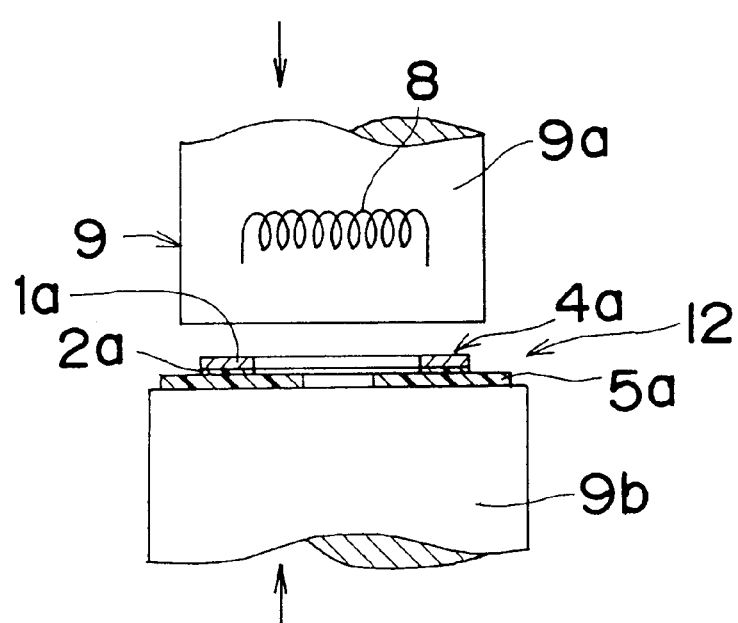
FIG. 7 is a schematic diagram for explaining a step of bonding between the metallic ring-plate and the elastic material ring-plate.

Subsequently, as shown in FIG. 7, the surface of the elastic material layer 2 of thermo-plastic resin of the metallic ring-plate 4a is adapted to contact the elastic material ring-plate 5a for overlapping, with centers thereof aligned with each other, and both plates 4a and 5a are bonded to each other through heating and pressurization by bonding dies 9a and 9b of a bonding press 9 heated by a heater 8, thereby to form the sealing plate 12. In the case where an adhesive material capable of bonding by pressurization is employed instead of the thermo-plastic resin of the elastic material layer 2, the bonding is effected by pressurization through employment of an unheated press.

Various modifications are considered for the method to overlap and bond the metallic ring-plate 4a and the elastic material ring-plate 5a to each other, with the centers thereof aligned with each other. A concrete example of the method will be described below with reference to FIGS. 8–17.

Figure 8:
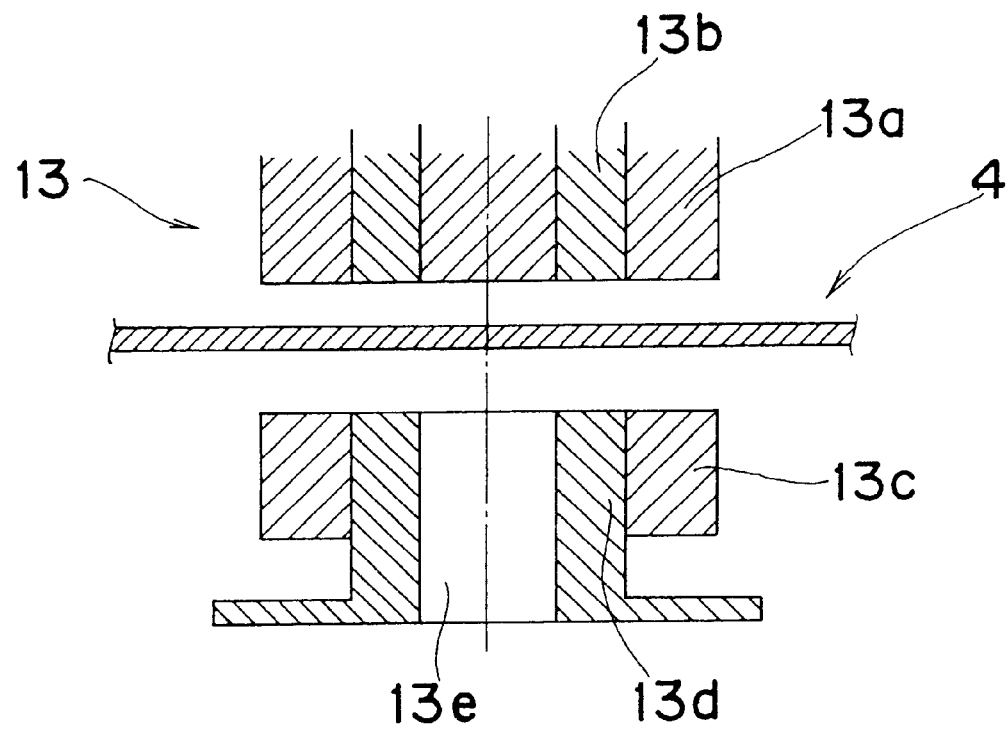
FIGS. 8, 9, 10, and 11 are schematic views for explaining steps of punching the metallic ring-plate punched from the metallic plate on which the elastic material is applied in a concrete method of the method in FIG. 1.
Figure 9:
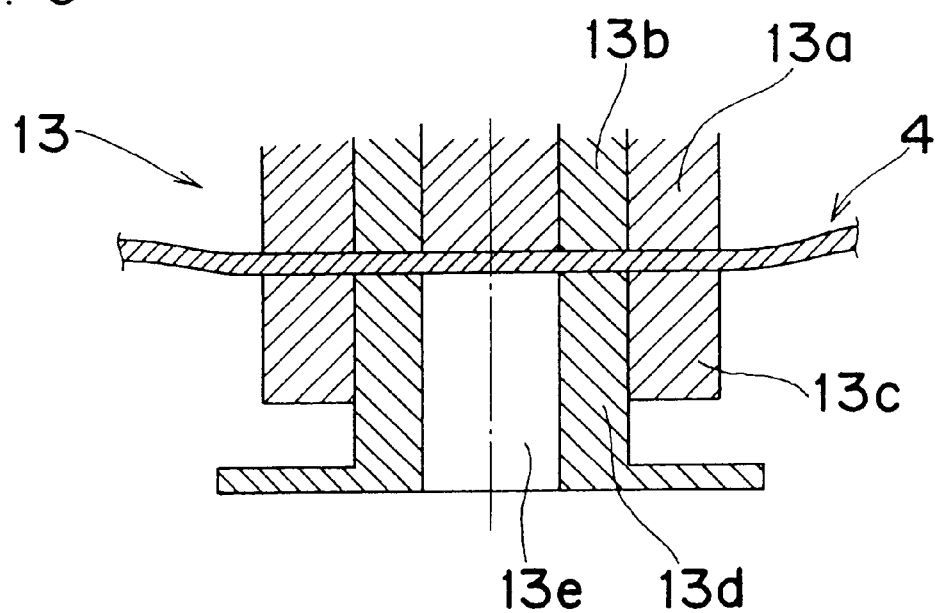
Figure 10:
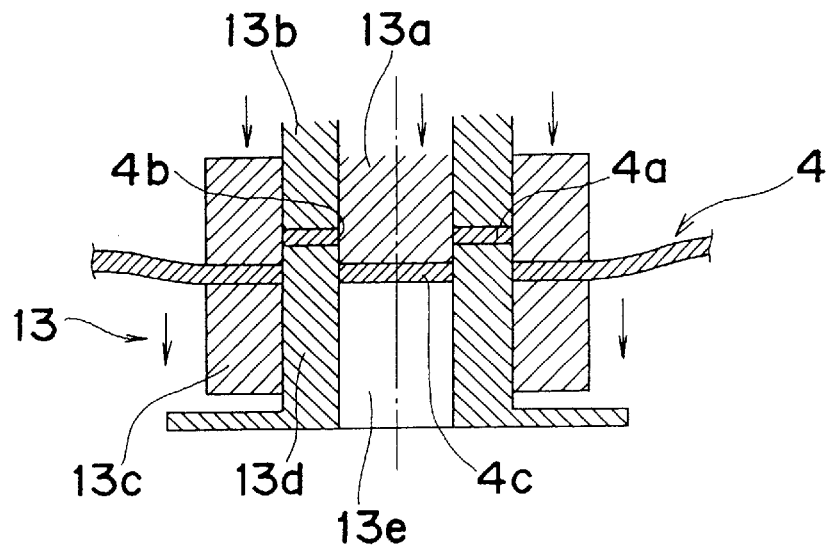
Figure 11:
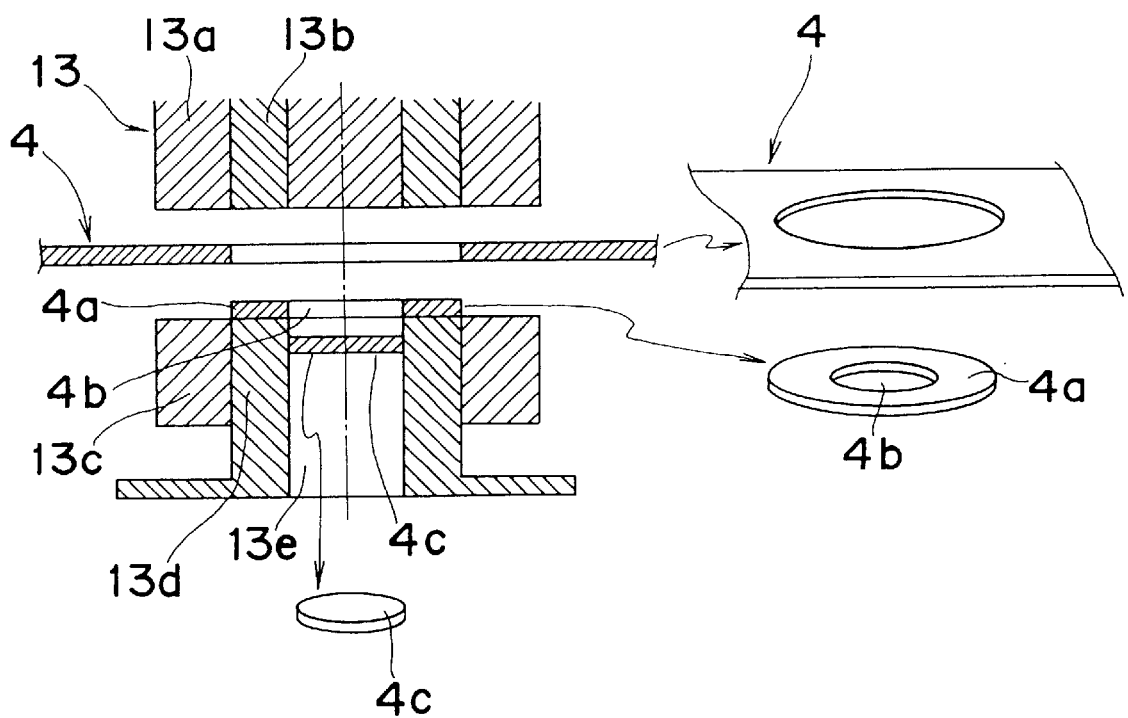
Figure 12:
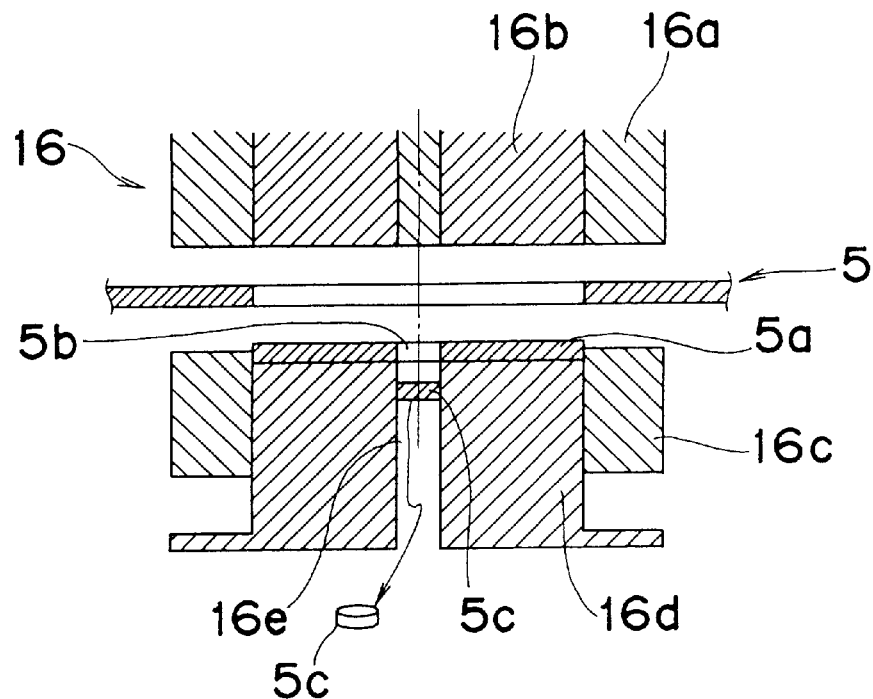
FIG. 12 is a schematic view for explaining a step of punching the elastic material ring-plate from the elastic material plate in a concrete method of the method in FIG. 4.

As shown in FIGS. 8 and 9, the material plate 4 composed of the metallic plate 1 covered with the elastic material layer 2 is held by a punching press 13. The punching press 13 includes an upper die 13a, 13b and a lower die 13c, 13d. The upper die is composed of a first die 13a having a center column portion and an outer cylindrical portion to achieve punching function and a second die 13b of a cylindrical body which is inwardly and outwardly surrounded by the first die 13a, the first and second dies 13a and 13b being independently and vertically driven by driving devices (not shown). The lower die is composed of a third die 13c of a cylindrical body and a forth die 13d of a static cylindrical body which is outwardly surrounded by the third die 13c, the third die 13c being independently and vertically driven by a driving device (not shown) with respect to the fourth die 13d which is not driven. First, the material plate 4 is held by the first through fourth dies 13a–13d of the upper and lower dies of the punching press 13 as shown in FIG. 9.

Then, the first die 13a of the upper die moves downwardly together with the third die 13c with respect to the second and fourth dies 13b and 13d, and thus, a ring portion of the material plate 4 is held by the second and fourth dies 13b and 13d while a center portion and a peripheral portion of the ring portion, i.e. the remaining portion of the material plate 4 is downwardly moved together with the first and third dies 13a and 13c, thus forming from the material plate 4 the metallic ring-plate 4a and a circular plate 4c which is cut out from the metallic ring-plate 4a to form a hole 4b at the center thereof. At the above pressing time, the center portion of the first die 13a is inserted into the center hole 13e of the fourth die 13d to cut out a circular plate 4c from the material plate 4. The formed metallic ring-plate 4a is held in a holder 10 described latter.

A punching press 13 including similar upper and lower dies 16a–16d to those dies 13a–13d is used for forming the elastic material ring-plate 5a from the elastic material plate 5. The upper and lower dies used in the formation of the elastic material ring-plate 5 have different sizes from those dies of the metallic ring-plate 5 in correspondence with the size of the elastic material ring-plate 5. Here, the first, second, third, and fourth dies 13a, 13b, 13c, and 13d for the formation of the metallic ring-plate 5 correspond to a first, second, third, and fourth dies 16a, 16b, 16c, and 16d for the formation of the elastic material ring-plate 5 in FIG. 12. That is, the first die 16a of the upper die moves downwardly together with the third die 16c with respect to the second and fourth dies 16b and 16d, and thus, a ring portion of the elastic material plate 5 is held by the second and fourth dies 16b and 16d while a center portion and a peripheral portion of the ring portion, i.e. the remaining portion of the elastic material plate 5 is downwardly moved together with the first and third dies 16a and 16c, thus forming from the elastic material plate 5 the elastic material ring-plate 5a and a circular plate 5c which is cut out from the elastic material ring-plate 5a to form a hole 5b at the center thereof, as clearly shown in FIG. 12. At the above pressing time, the center portion of the first die 16a is inserted into the center hole 16e of the fourth die 16d to cut out a circular plate 5c from the elastic material plate 5. The formed elastic material ring-plate 5a is held on the third and fourth dies 16c and 16d.

Figure 13:
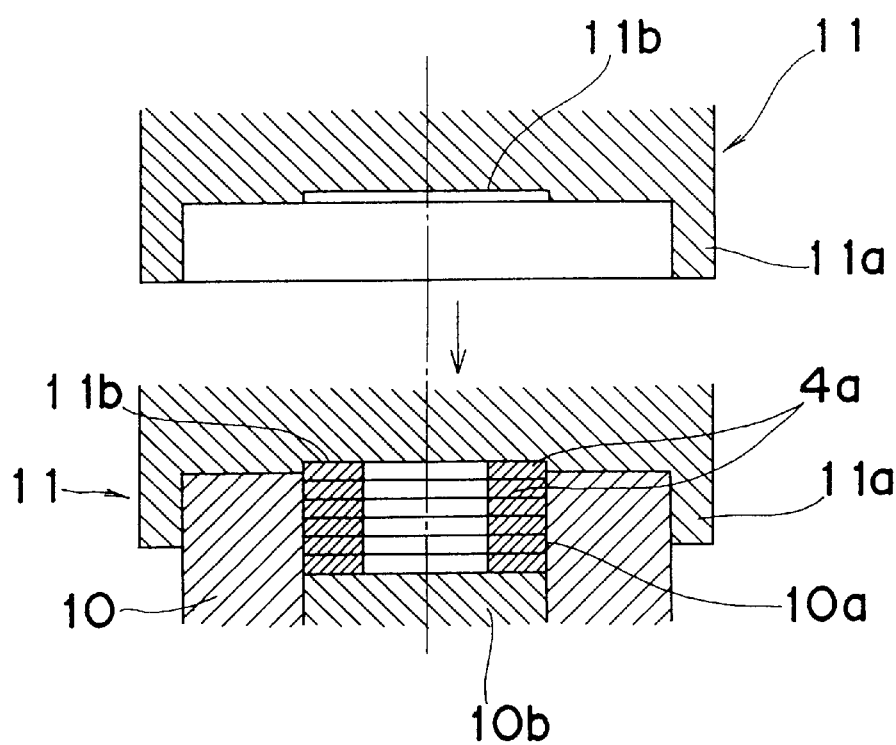
FIGS. 13 and 14 are schematic views for explaining steps of attracting one of the metallic ring-plate from a holder in the concrete method.
Figure 14:
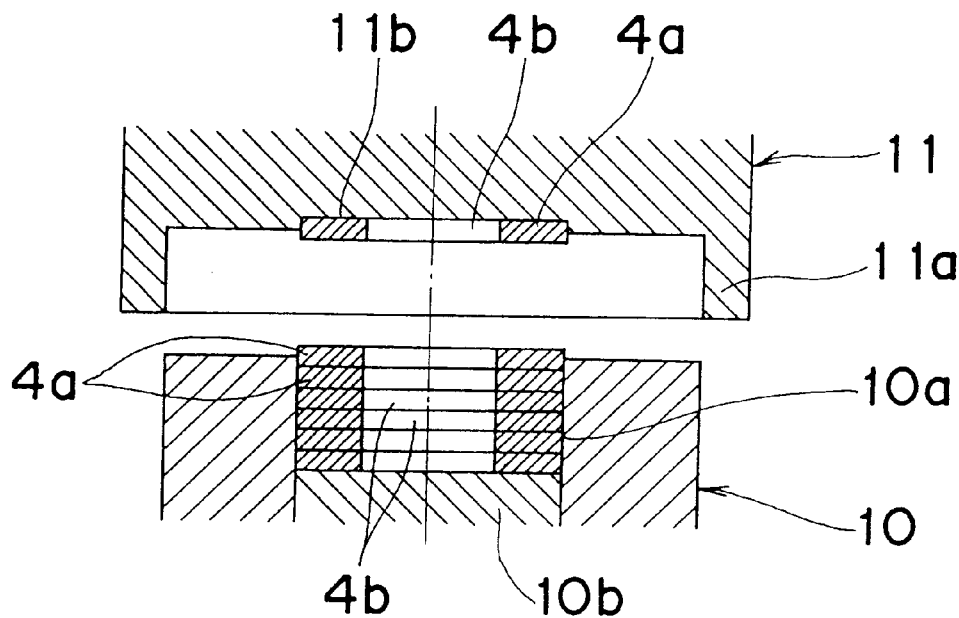
Figure 15:
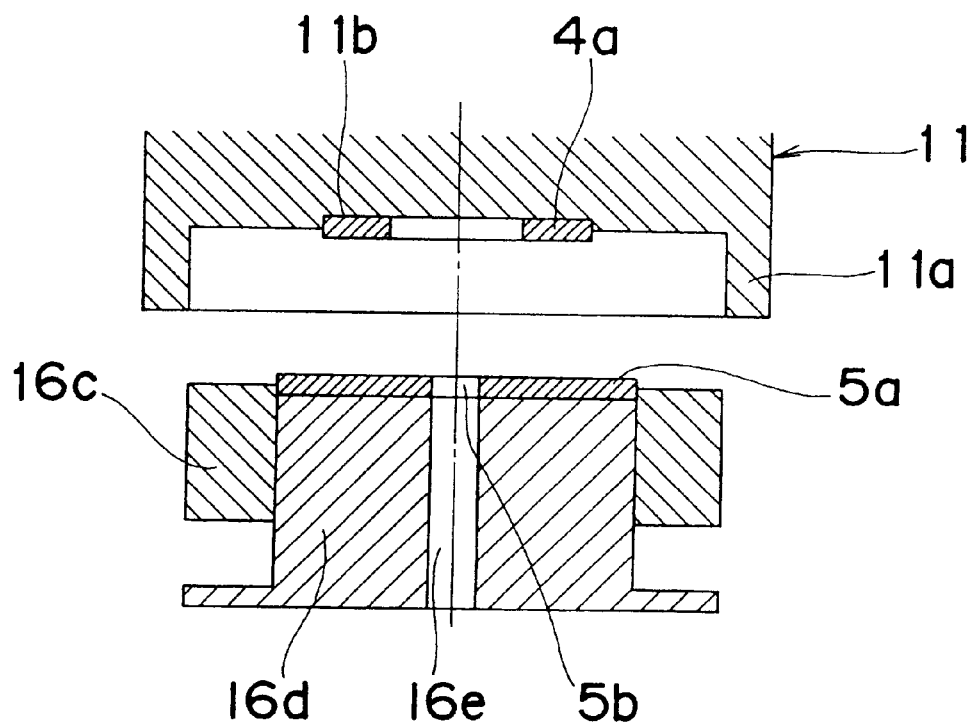
FIGS. 15, 16, and 17 are schematic views for explaining steps of overlapping and bonding the metallic ring-plate and the elastic material ring-plate in the concrete method.
Figure 16:
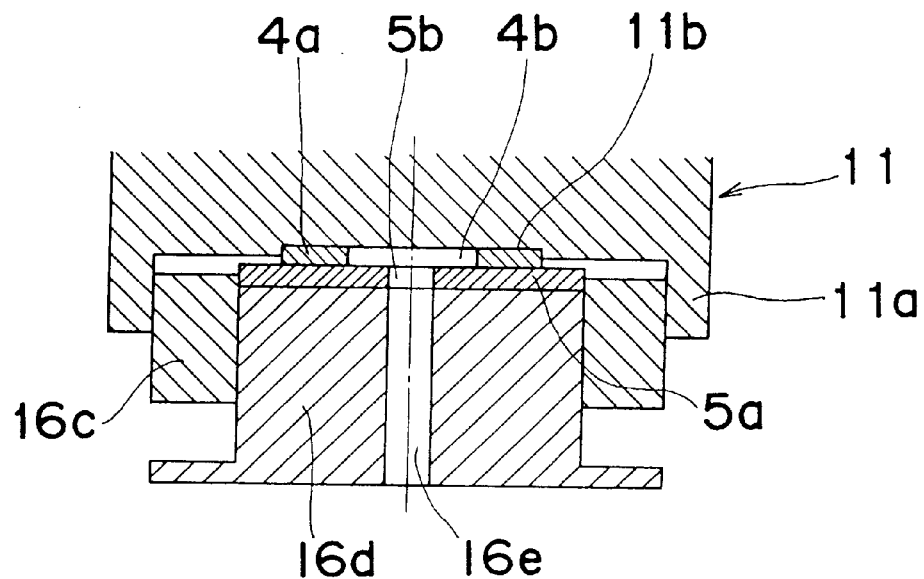

Subsequently, as shown in FIG. 13, a plurality of metallic ring-plates 4a formed above are piled upon a pusher lob of the holder 10, with their center points aligned with each other by restricting the outer peripheries of the metallic ring-plates 4 by a recess 10a thereof. One of the metallic plates 4a is fitted and attracted by a magnetic force into a shallow recess 11b of an attracting means 11. The attracting means 11 includes a ring-shaped guide portion 11a having an inner diameter coinciding with an outer peripheral diameter of the third die 16c of the punching press 16. The shallow recess 11b receives one of the metallic plates 4a having the same inner diameter and center point as those of the guide portion 11a by the magnetic force of the attracting means 11 as shown in FIG. 14. Then, with respect to the elastic material ring-plate 5a blanked and placed on the fourth die 16d of the punching press 16, the guide portion 11a is fitted over the outer periphery of the fourth die 16d so as to overlap the metallic ring-plate 4a with the elastic material ring-plate 5a for subsequent pressurization as shown in FIGS. 15 and 16. In this case, the center point of the metallic ring-plate 4a is automatically aligned with that of the elastic material ring-plate 5a. When the elastic material layer having the adhesive property formed on the metallic ring-plate 4a is of thermo-plastic resin, a heating means such as the heater 8 is provided on the attracting means 11 for heating and pressurization of the overlapped elastic material ring-plate 5a and the metallic ring-plate 4a.

The attraction of the metallic ring-plate 4a onto the attracting means 11 can be effected by air instead of a magnet.

Instead of using the holder 10, it can be so modified that the third die 13c of the punching press 13 having the outer peripheral diameter equal to the inner diameter of the guide portion 11a of the attracting means 11 is utilized as it is so as to attract the metallic ring-plate 4a blanked and placed on the third and fourth dies 13c and 13d, by the attracting means 11.

It is to be noted here that the metallic ring-plate 4a can be adapted to be attracted by the attracting means 11 every time one metallic ring-plate 4a is blanked by the punching press 13, and that the third and fourth dies 13c and 13d is so modified as to successively overlap and collect the blanked metallic ring-plates 4a, with the center points thereof aligned with each other. When the metallic ring-plates 4a are held in the holder 10, the elastic material ring-plates 5a can be held in a holder similar to the holder 10.

Moreover, in the method as described above with reference to FIGS. 8–17, the attracting means 11 can be arranged to attract the elastic material ring-plate 5a and the elastic material ring-plates 5a can be bonded in the overlapped state on the metallic ring-plate 4a.

As another method of overlapping the metallic ring-plate 4a and the elastic material ring plate 5a, with the center points thereof aligned with each other, instead of using the ring-shaped guide portion 11a as the guide means 11, a protrusion (not shown) which can be fitted into each hole of the metallic ring-plate 4a and the elastic material ring-plate 5a is provided on the third die 13c and the fourth die 13d of the punching press 13 or on a separate base to serve as a guide means.

Figure 17:
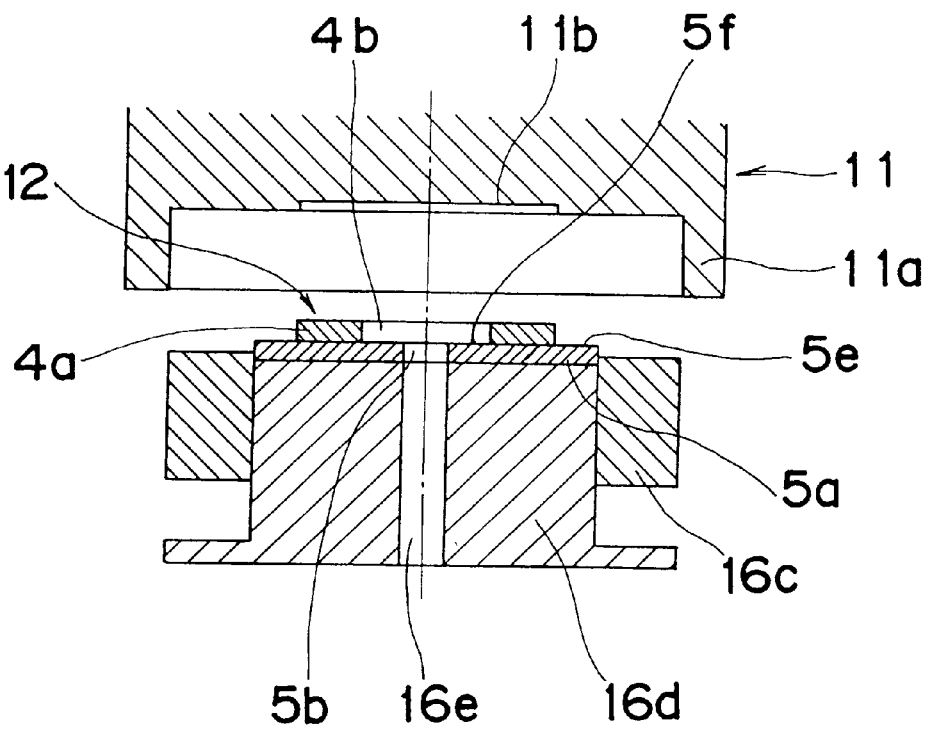

More specifically, in the case where the diameters of the inner holes 4b, 5b for the metallic ring-plate 4a and the elastic material ring-plate 5a are equal to each other as shown in FIGS. 20 and 21, the protrusion having a diameter coinciding with the inner hole diameter is provided. When the inner hole diameter of the metallic ring-plate 4a is larger than that of the elastic material ring-plate 5a as shown in FIGS. 17 and 18, the protrusion is arranged to have stepped portions, i.e., a first portion coinciding with the inner hole diameter of the metallic ring-plate 4a, and a second portion coinciding with the inner hole diameter of the elastic material ring-plate 5a, with center points of the two portions being aligned.

When the metallic ring-plate 4a and the elastic material ring-plate 5aare fitted over the above protrusion for overlapping, and are pressurized or heated and pressurized subsequently, the metallic ring-plate 4a and the elastic material ring-plate 5a are automatically bonded, with the same center points as shown in FIG. 16.

Figure 19:
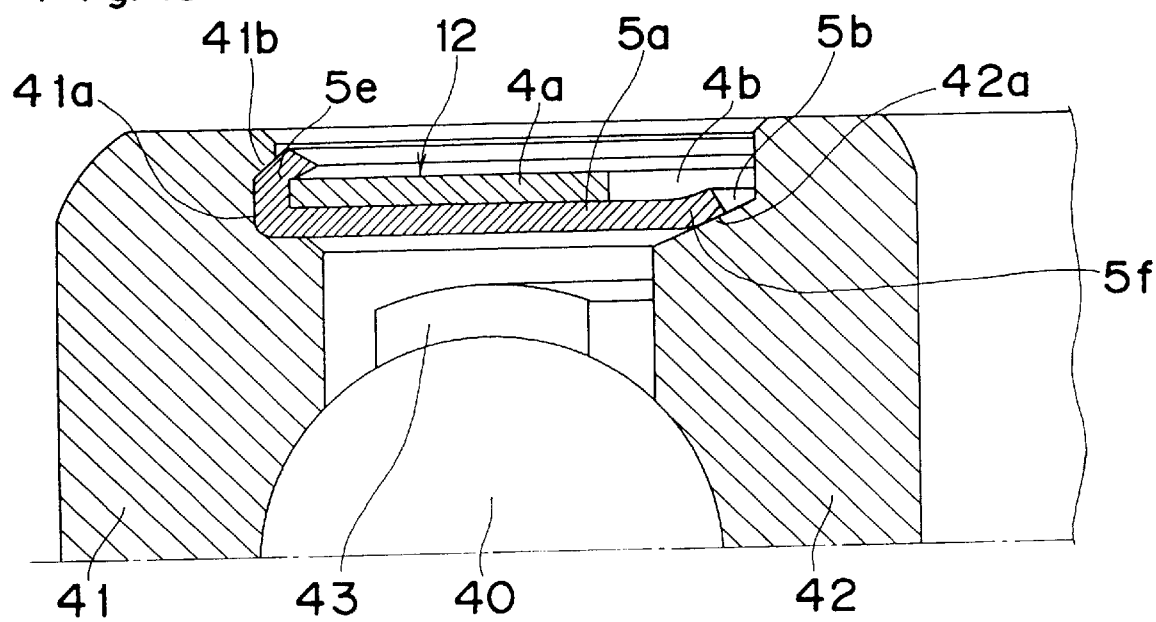
FIG. 19 is a partial and enlarged cross-sectional side view of the bearing on which the sealing plate in FIG. 18 is mounted.

Hereinafter, a method of mounting the sealing plate 12 shown in FIG. 17 and 18 produced in the practice as described so far onto a bearing will be explained with reference to FIGS. 18 and 19.

With the elastic material ring-plate 5a of the sealing plate 12 directed downwards, a forward edge portion of an inner ring 42 of a bearing is inserted into the inner hole 4b, 5b of the sealing plate 12, and when the edge portion of the sealing plate 12 is forced into a sealing groove 41a of an outer ring 41, the outer peripheral edge portion 5e of the elastic material ring-plate 5a protruding from the outer peripheral edge of the metallic ring-plate 4a is bent or folded. An extreme edge portion of the portion 5e is further depressed by an upper shoulder portion 41b of the sealing groove 41a, and extends out of the sealing groove 41a above the outer edge of the metallic ring-plate 4a in such a manner as to wrap the outer peripheral edge of the metallic ring-plate 4a, and thus, the bent portion of the outer peripheral edge portion 5e of the elastic material ring-plate 5a is forced into the sealing groove 41a under pressure. Consequently, the curved face of the outer peripheral portion 5e closely contacts the upper shoulder portion 41b of the sealing groove 41a and the bottom portion, while the inner peripheral edge portion 5f of the elastic material ring-plate 5a also closely contacts a stepped portion 42a of the inner ring 42, thereby to seal the bearing. In the above case, since the outer peripheral edge portion 5e of the elastic material ring-plate 5a has resiliency to be bent, the curved face gets to fit the shape of the sealing groove 41a, and therefore, it is not necessary to pay particular attention to the shape of the sealing groove 41a. In FIG. 19, reference numeral 40 denotes a ball of the bearing, and 43 denotes a retainer.

It is to be noted here that when the elastic material layer 2 having the adhesive property is formed on the metallic plate 1 as shown in FIG. 1, such elastic material layer 2 is not required to be formed on the elastic material plate 5, and thus, such elastic material layer 2 with the adhesive property has only to be form on either one of the metallic plate 1 or elastic material plate 5.

Figure 23:
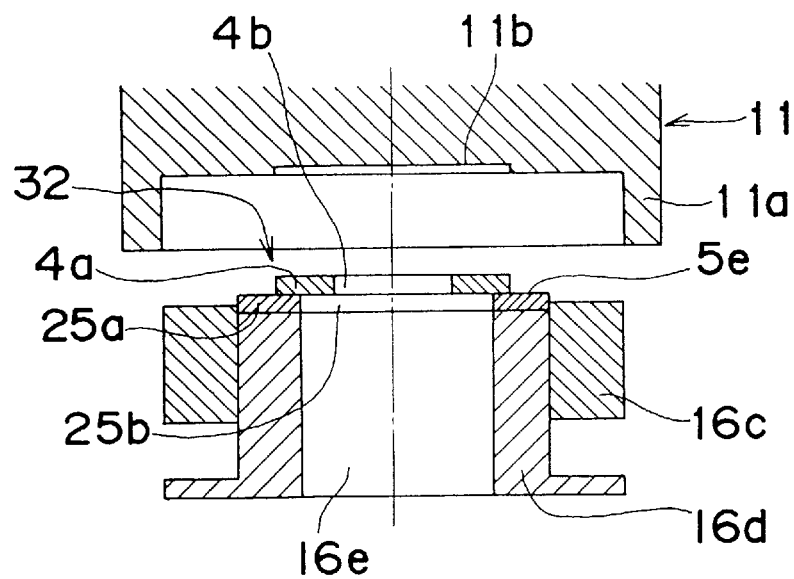
FIG. 23 is a schematic view for explaining a step of overlapping and bonding the metallic ring-plate and the elastic material ring-plate in still another concrete method.
Figure 24:
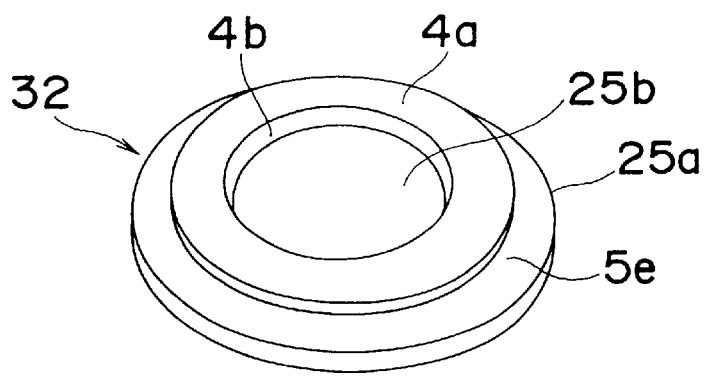
FIG. 24 is a perspective view of the sealing plate manufactured by the concrete method in FIG. 23.
Figure 25:
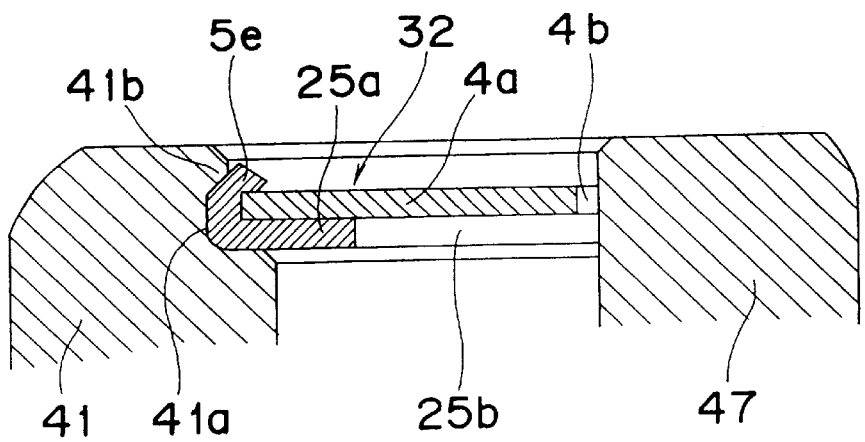
FIG. 25 is a partial and enlarged cross-sectional side view of the bearing on which the sealing plate in FIG. 24 is mounted.
Figure 26:
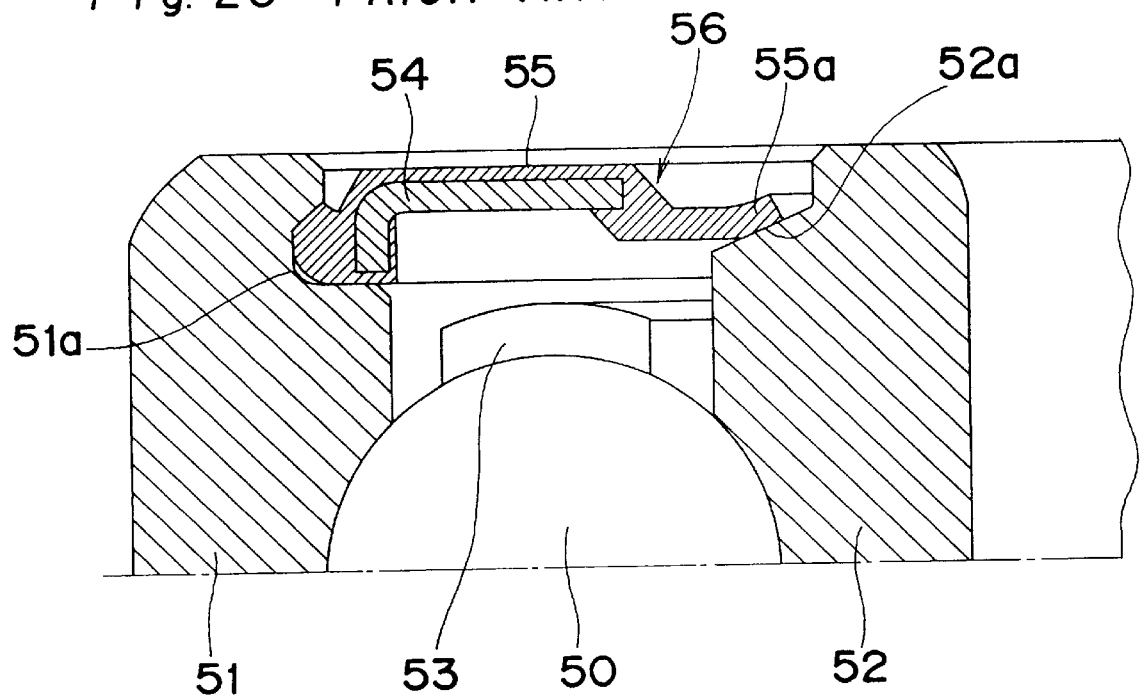
FIG. 26 is a partial and enlarged cross-sectional side view of a bearing on which a conventional sealing plate is mounted.

The embodiment is described in the case where the sealing plate 12 is so constructed that the diameter of the inner hole 4b of the metallic ring-plate 4a is larger than that of the inner hold 5b of the elastic material ring-plate 5a. However, the present invention can be applied to another sealing plate 22 wherein the diameter of the inner hole 4b of the metallic ring-plate 4a is equal to that of the inner hole 15b of the elastic material ring-plate 15a as shown in FIGS. 20–22, or another sealing plate 32 wherein the diameter of the inner hole 4b of the metallic ring-plate 4a is smaller than to that of the inner hole 25b of the elastic material ring-plate 25a as shown in FIGS. 23–25. Those sealing plates 22 and 32 can have the same function and effects as those of the sealing plate 12. In the sealing plate 32, a space defined by the retainer and the sealing plate 32 can be enlarged to increase the holding amount of grease therein because the inner hole diameter of the elastic material ring-plate 25a is larger than that of the metallic ring-plate 4a.

The outer peripheral edge portion 5e of each elastic material ring-plate 5a, 15a, and 25a is preferably adapted to protrude or extend outwardly from the peripheral edge of the metallic ring-plate 4a by the width a for achieving the above sealing function.

The elastic material layer 2 can be formed on the metallic plate 1 by placing or bonding onto the metallic plate 1 a sheet previously formed by elastic material, instead of spraying or painting the elastic material onto the metallic plate 1.

As is clear from the foregoing description, in the manufacturing method of the bearing sealing plate according to the embodiments, the step for removal of burr can be dispensed with, since no metal mold is required. Due, to the fact that the preliminarily vulcanized elastic material is used, a vulcanization process is not required, and thus, the sealing plate can be readily obtained only by blanking or punching and bonding at low cost.

Furthermore, the sealing plate thus produced is simple in construction and can be readily attached to the bearing without requiring any particular consideration for the bearing sealing groove.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A sealing plate and bearing combination comprising:
   a sealing plate for a bearing, said sealing plate comprising:
   a metallic ring-plate punched from a metallic plate by a punching press;
   a vulcanized elastic material ring-plate punched from an elastic material plate by a punching press and having an outer peripheral edge portion outwardly protruded from an outer peripheral edge of the metallic ring-plate and closely contacting an upper shoulder portion and a bottom portion of a sealing groove of the bearing at a bent or folded curved face of the outer peripheral portion when the sealing plate is fitted into the bearing; and
   an elastic material layer formed on a surface of one of the metallic plate and the vulcanized elastic material plate and having an adhesive property for bonding the metallic ring-plate and the vulcanized elastic material ring-plate by overlapping the metallic ring-plate and the elastic material ring-plate, with the elastic material layer having the adhesive property being positioned between the metallic ring-plate and the elastic material ring-plate and with centers of the metallic ring-plate and the vulcanized elastic material ring-plate being aligned with each other, and pressing and/or pressing and heating, thereby to form the sealing plate;
   the sealing plate and bearing combination further comprising:

a ball bearing comprising:
  an inner ring having a forward edge portion which is inserted into an inner hole of the sealing plate; and
  an outer ring having a sealing groove into which an edge portion of the sealing plate is forced so that the outer peripheral edge portion of the elastic material ring-plate protruding from the outer peripheral edge of the metallic ring-plate is bent or folded, the sealing groove having an upper shoulder portion for depressing an edge portion of the outer peripheral edge portion to extend the edge portion of the outer peripheral edge portion out of the sealing groove above the outer edge of the metallic ring-plate in such a manner as to wrap the outer peripheral edge of the metallic ring-plate, and thus, a bent or folded portion of the outer peripheral edge portion of the elastic material ring-plate is forced into the sealing groove under pressure;
  wherein a bent or folded curved face of the outer peripheral portion closely contacts the upper shoulder portion and the bottom portion of the sealing groove, and an inner peripheral edge portion of the elastic material ring-plate closely contacts a stepped portion of the inner ring, thereby to seal the bearing.

2. The ball bearing as claimed in claim 1, wherein the outer peripheral edge portion of the elastic material ring-plate has resiliency to he bent so that the curved face gets to fit a shape of the sealing groove.

3. The ball bearing as claimed in claim 1, wherein the elastic material ring-plate is made of a selected one of vulcanized natural rubber and vulcanized synthetic rubber.

4. The ball bearing as claimed in claim 1, wherein the outer peripheral edge portion of the elastic material ring-plate extends outwardly from the outer peripheral edge of the metallic ring-plate by such a width as to be bent for wrapping the outer peripheral edge of the metallic ring-plate therein when it is forced into a sealing groove of the bearing for sealing.

5. The ball bearing as claimed in claim 1, wherein a diameter of an inner hole of the metallic ring-plate is larger than a diameter of an inner hole of the elastic material ring-plate so that an inner peripheral edge portion of the elastic material ring-plate closely contacts a stepped portion of an inner ring of the bearing, thereby to seal the bearing.

6. The ball bearing as claimed in claim 1, wherein a diameter of an inner hole of the metallic ring-plate is not larger than a diameter of an inner hole of the elastic material ring-plate.

7. The sealing plate and bearing combination as claimed in claim 1, wherein the elastic material layer formed on a surface of one of the metallic ring-plate and the vulcanized elastic material ring-plate is formed in a plane, said stepped portion of the inner ring being a surface which is sloped with respect to said plane.

8. The sealing plate and bearing combination as claimed in claim 1, wherein said stepped portion of the inner ring is formed by a first surface which extends generally perpendicular to the surface of the metallic ring-plate and a second surface which is sloped with respect to the surface of the metallic ring-plate.

* * * * *